W. W. VAN LOAN.
Plow.
No. 19,391.
Patented Feb. 16, 1858.
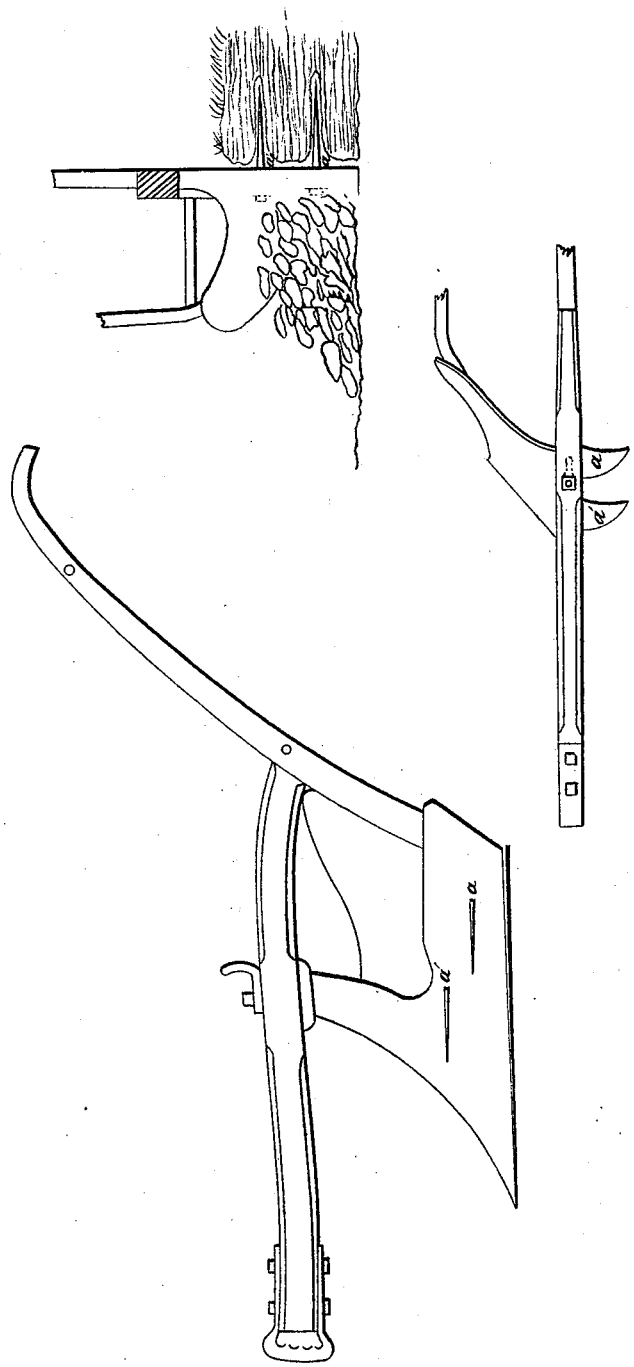

UNITED STATES PATENT OFFICE.

W. W. VAN LOAN, OF CATSKILL, NEW YORK.

IMPROVEMENT IN PLOWS.

Specification forming part of Letters Patent No. 19,391, dated February 16, 1858.

*To all whom it may concern:*

Be it known that I, WM. W. VAN LOAN, of Catskill, in the county of Greene and State of New York, have invented an Improvement in Plows; and I do hereby declare that the following is a full, clear, and exact description of the principle or character which distinguishes it from all other things before known, and of the usual manner of making, modifying, and using the same, reference being had to the accompanying drawings, of which—

Figure 1 is a side elevation of the plow; Fig. 2, a front view of the plow in the ground; Fig. 3, a top view of plow.

My invention consists in the attachment of a horizontal cutter to the landside of a plow for cutting under the land, so that it may be turned over by the mold-board during the succeeding cut with ease.

The invention is intended for sward and tough land, and is especially adapted to prairie-soil, which is filled with tough roots. The cutter or blade $a$ is fixed firmly to the landside, and is to be fixed at the depth which will be required by different soils, according to its tenacity and the depth and strength of the roots. In prairie-soil the cutter must be placed at or near the sole of the plow. In light, friable land and where the roots are not strong, it may be placed higher, and where the resistance is not very great a second cutter, $a'$, may be added; but the greatest advantage is derived from the cutter $a$ as used in prairie-land, where, by cutting under the land and severing the mass of roots in the soil, the next furrow-slice is turned over by the mold-board with much greater ease than without such cut, the force in making the cut being small compared with the power gained in turning a broad furrow-slice.

I am aware that pulverizing-blades have been attached to the mold-board of plows, and also placed in rear of cultivators; but neither of these can perform the function of my under cutters, and I lay no claim to such devices.

What I claim as my invention is—

The attachment of one or more horizontal cutters to the landside of the plow, whereby the land is cut horizontally below the surface, so that it may be turned over by the mold-board during the succeeding cut with greater ease, substantially an set forth.

W. W. VAN LOAN.

Witnesses:
WM. STENTON,
HENRY J. HOPPER.